(No Model.)
R. A. BERGER.
ROLLER BEARING.
No. 543,720. Patented July 30, 1895.
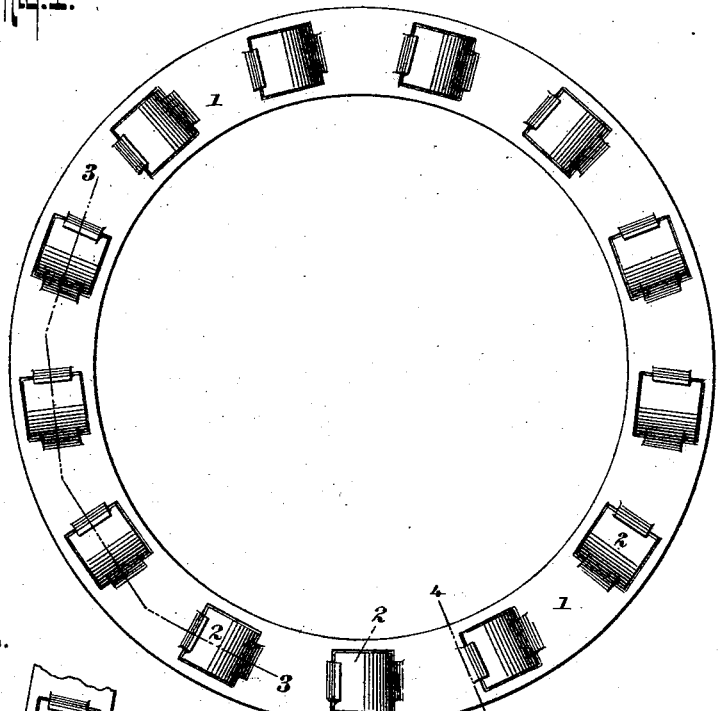
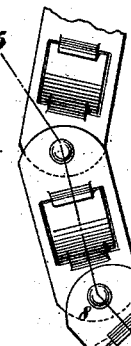
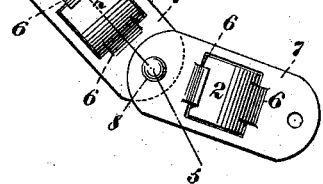
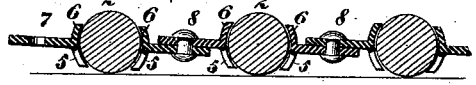
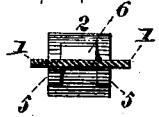
WITNESSES:
Gustave Dieterich.
John Kehlenbeck
INVENTOR
Richard A. Berger.
BY
Albert H. Norris
ATTORNEY.

UNITED STATES PATENT OFFICE.

RICHARD A. BERGER, OF BROOKLYN, NEW YORK.

ROLLER-BEARING.

SPECIFICATION forming part of Letters Patent No. 543,720, dated July 30, 1895.

Application filed June 17, 1895. Serial No. 552,983. (No model.)

*To all whom it may concern:*

Be it known that I, RICHARD A. BERGER, a citizen of the United States, residing at Brooklyn, in the county of Kings and State of New York, have invented new and useful Improvements in Roller-Bearings, of which the following is a specification.

This invention relates to that class or type of antifriction roller-bearings for the fifth-wheels of vehicles, turn-tables, and other objects or structures wherein rollers or rotatable bearings are mounted in a carrier or cage designed to be placed between the upper and lower circle-irons or sections of the fifth-wheel or turn-table.

The chief object of my present invention is to provide a new and improved roller-bearing which can be more rapidly and conveniently manufactured and which is more simple and economical than prior devices of the kind, and wherein the rollers or rotatable bearings are loosely confined in proper working position through the medium of lips or lugs struck up from the metal of the carrier or cage and located at opposite edges of the openings through which the peripheries of the rollers or rotatable bearings project to bear against the upper and lower circle-irons or sections of the fifth-wheel, turn-table, or other device or structure.

To accomplish this object my invention consists, essentially, in a roller-bearing comprising a rotatable bearing and a single thickness of sheet metal having an opening to receive the rotatable bearing and slitted and formed integral with lips or lugs of the same thickness as the thickness of the sheet metal, said lugs projecting above and below the surfaces of the sheet metal and loosely confining the rotatable bearing in position.

Figure 1 is a plan view of a roller-bearing embodying my invention. Fig. 2 is a similar view showing a modification of my invention. Fig. 3 is a detail sectional view taken on the line 3 3, Fig. 1. Fig. 4 is a similar view taken on the line 4 4, Fig. 1; and Fig. 5 is a similar view taken on the line 5 5, Fig. 2.

In order to enable those skilled in the art to make and use my invention, I will now describe the same in detail, referring to the drawings, in which—

The numeral 1, Figs. 1, 3, and 4, indicates a carrier or cage which is composed of a circular plate or ring of iron, steel, or other metal suitable for the purpose in hand. This plate or ring is formed at proper intervals between its curved edges with approximately rectangular openings or orifices, each adapted to receive a roller or rotatable bearing 2, which, as here shown, is in the form of a short section of a solid cylinder. The end edges of each opening are each formed with a downwardly-projecting lip or lug 5 and two upwardly-projecting lips or lugs 6, curved in the arc of a circle struck from the center of the cylindrical roller in such manner that the lips or lugs at the opposite end edges of each opening or orifice approximately conform to and are adapted to bear against the periphery of a cylindrical roller to loosely retain it in proper operative connection with the circular plate or ring at the opening or orifice therein provided for such cylindrical roller.

The lips or lugs can be conveniently and rapidly formed by slitting the metal of the circular plate or ring and subsequently bending the lugs 5 downwardly and the lugs 6 upwardly, after which the cylindrical rollers are approximately centered in the openings or orifices and the lips or lugs at the opposite end edges of each opening or orifice are approximately conformed to the periphery of the roller therein located, or such lips or lugs are simply bent or pressed toward the center of the roller to partially embrace the same and thus loosely retain it in position.

If the carrier or cage is composed of a single piece of metal in the form of a curved plate or a ring, the openings or orifices require to be laid off carefully with reference to the geometrical axis or center of the curved plate or ring; but this special care is not necessary if the carrier or cage be composed of a plurality of link-plates 7, Figs. 2 and 5, pivotally connected together at their ends through the medium of pivot-pins 8 to produce an endless chain of link-plates, each having an opening or orifice, the end edges of which are formed with the lips or lugs 5 and 6, as before explained, to loosely retain a cylindrical roller 2. The lips or lugs struck up integral with the link-plates, and extending upwardly and downwardly therefrom in the manner described and shown, to partially embrace and loosely confine or retain the rollers in position, render it possible to make the carrier or cage, Figs. 1, 3 and 4, of a single plate of metal, instead of two superimposed metal plates, as heretofore practiced in that class of roller-bearings composed of roller-carrying plates or rings, and further the lips or lugs, constructed and arranged as described, render it possible to make a flexible chain-link roller-bearing, wherein each link is composed of a single piece of metal, instead of two pieces arranged one above the other and between which the roller is retained, as I have heretofore and do now construct roller-bearings. It will therefore be obvious that my present device is more simple and economical than the prior devices to which I referred to above, and that the simplified and improved construction can be conveniently and rapidly manufactured with comparatively inexpensive and simple machinery.

The construction of the roller carrier or cage of separate link-plates pivotally connected at their ends provides a flexible chain-link roller-bearing, which can be readily fitted to the fifth-wheels of vehicles, or to turn-tables or any other object or structure wherein it is desired to use an antifriction roller-bearing between two parts or sections, one of which is movable relatively to the other.

The improved roller carrier or cage, whether composed of a single curved plate or ring, as in Figs. 1, 3, and 4, or of pivotally connected link-plates, as in Figs. 2 and 5, can be made of thin sheet metal, from which the lips or lugs can be readily struck up after properly slitting the metal, as will be obvious, to provide the portions required to be bent laterally or outwardly to constitute the lips or lugs. By this construction the lips or lugs are of the same thickness as the thickness of the sheet-metal plate, no metal is wasted, the construction is simple, and the device can be conveniently and economically manufactured.

The lips or lugs are not necessarily curved to accurately conform to the circles of the rollers, as the mere bending or pressing of the lugs at one end edge of each opening or orifice toward those at the opposite end edge of such opening or orifice, so that the lugs partially embrace the roller placed in the opening or orifice, is sufficient to retain the roller in operative connection with the carrier or cage.

The provision of the lips or lugs on the carrier or cage engaging or acting upon the peripheries of the rollers entirely avoids the necessity of providing the rollers with axles or journals to rotate in or engage bearings provided on the carrier or cage, as is usual where the latter is composed of a single plate of metal.

If the roller carrier or cage is constructed of single flattened plates of metal pivotally connected together it can be manufactured like a chain of indefinite length and divided into sections of definite length to suit the conditions required. By this means roller-bearings, from the greatest diameter or radius to the least diameter or radius, can be manufactured with facility and economy.

I have illustrated the carrier or cage in the form of an annulus or ring, but do not wish to be understood as confining myself to such form.

Having thus described my invention, what I claim is—

1. A roller-bearing, consisting of a rotatable bearing, and a carrier or cage comprising a single thickness of sheet metal having an opening to receive the rotatable bearing and slitted and formed integral with lips or lugs of the same thickness as the thickness of the sheet metal, said lugs projecting above and below the surfaces of the sheet metal and loosely confining the rotatable bearing in position, substantially as and for the purposes shown and described.

2. A roller-bearing, consisting of a carrier or cage comprising a single thickness of metal having a rectangular roller-receiving orifice and formed integral at opposite edges with lips or lugs which project above and below the surfaces of the said single thickness of metal, and an approximately cylindrical roller retained in the rectangular opening by said lips or lugs, substantially as and for the purposes described.

3. A roller-bearing, consisting of rollers, and a plurality of pivotally connected links, each link being composed of a single thickness of metal having a roller-receiving orifice, and formed integral at opposite edges with lips or lugs which project above and below the surfaces of said single thickness of metal and serve to loosely confine a roller in the roller-receiving orifice, substantially as and for the purposes described.

In testimony whereof I have hereunto set my hand in presence of two subscribing witnesses.

RICHARD A. BERGER.

Witnesses:
DANIEL BRADLEY,
JULIA T. IRWIN.